(12) United States Patent
Varian

(10) Patent No.: US 8,566,712 B1
(45) Date of Patent: Oct. 22, 2013

(54) IMAGE MANAGEMENT

(75) Inventor: Hal R. Varian, Lafayette, CA (US)

(73) Assignee: Google Inc., Mountain View, CA (US)

(*) Notice: Subject to any disclaimer, the term of this patent is extended or adjusted under 35 U.S.C. 154(b) by 1119 days.

(21) Appl. No.: 11/324,213

(22) Filed: Jan. 4, 2006

(51) Int. Cl.
G06F 21/53 (2013.01)

(52) U.S. Cl.
USPC .............................. 715/273; 715/234; 715/742

(58) Field of Classification Search
USPC .................... 715/234, 243, 742, 273
See application file for complete search history.

(56) References Cited

U.S. PATENT DOCUMENTS

| | | | |
|---|---|---|---|
| 5,890,172 A * | 3/1999 | Borman et al. | 715/205 |
| 6,271,840 B1 * | 8/2001 | Finseth et al. | 715/236 |
| 6,523,022 B1 * | 2/2003 | Hobbs | 707/3 |
| 6,772,146 B2 * | 8/2004 | Khemlani et al. | 705/36 R |
| 7,437,351 B2 * | 10/2008 | Page | 707/3 |
| 2001/0029527 A1 * | 10/2001 | Goshen | 709/218 |
| 2001/0056418 A1 * | 12/2001 | Youn | 707/3 |
| 2002/0075316 A1 * | 6/2002 | Dardick | 345/808 |
| 2002/0152245 A1 * | 10/2002 | McCaskey et al. | 707/530 |
| 2003/0126136 A1 * | 7/2003 | Omoigui | 707/10 |
| 2004/0250205 A1 * | 12/2004 | Conning | 715/517 |
| 2005/0004985 A1 * | 1/2005 | Stochosky | 709/205 |
| 2005/0015710 A1 * | 1/2005 | Williams | 715/500 |
| 2005/0070262 A1 * | 3/2005 | Weigand | 455/418 |
| 2005/0097180 A1 * | 5/2005 | Abdelhak | 709/208 |
| 2005/0097190 A1 * | 5/2005 | Abdelhak | 709/217 |
| 2005/0149549 A1 * | 7/2005 | Jaspers et al. | 707/102 |
| 2005/0154781 A1 * | 7/2005 | Carlson et al. | 709/203 |
| 2005/0216825 A1 * | 9/2005 | Teague | 715/501.1 |
| 2005/0256867 A1 * | 11/2005 | Walther et al. | 707/5 |
| 2006/0074923 A1 * | 4/2006 | Gower et al. | 707/100 |
| 2006/0212798 A1 * | 9/2006 | Lection et al. | 715/513 |
| 2006/0259852 A1 * | 11/2006 | Upendran et al. | 715/500.1 |
| 2007/0156913 A1 * | 7/2007 | Miyamoto et al. | 709/230 |
| 2007/0156923 A1 * | 7/2007 | Kumar | 709/246 |
| 2008/0077558 A1 * | 3/2008 | Lawrence et al. | 707/3 |

FOREIGN PATENT DOCUMENTS

EP 1415245 A2 * 5/2004

OTHER PUBLICATIONS

Enhancing Presentation Level Integration of Remote Applications and Services in Web Portals Rainer Weinreich, IEEE 2005.*
mPERSONA: Personalized Portals for the Wireless User: An Agent Approach, Panayiotou et al., Department of Computer Science, University of Cyprus, CY-1678 Nicosia, Cyprus.*
Benjamin, Random Image Rotation, published Oct. 20, 2003, pp. 1-3.*
Benjamin, Random Image Rotation, 2003, pp. 1-3.*
MultiFrame slide show by HOTSCRIPTS, published Apr. 2004, pp. 1-2.*
A Better Image Rotator by Benjamin, Published Aug. 2004, pp. 1-4.*
"Google Gets Better. What's Up With That?" http://www.nytimes.com, New York Times; Print Date: Aug. 26, 2005; 2 pp.

* cited by examiner

Primary Examiner — Stephen Hong
Assistant Examiner — Ahamed I Nazar
(74) Attorney, Agent, or Firm — Harrity & Harrity, LLP

(57) ABSTRACT

A server receives information from a user, where the information designates one or more images that the user is interested in seeing when viewing a web portal. The server stores the received information. The server generates a web page that includes links to one or more of the designated images based on the stored information, where the web page is generated when the user visits the web portal and sends the generated web page to the user.

31 Claims, 15 Drawing Sheets

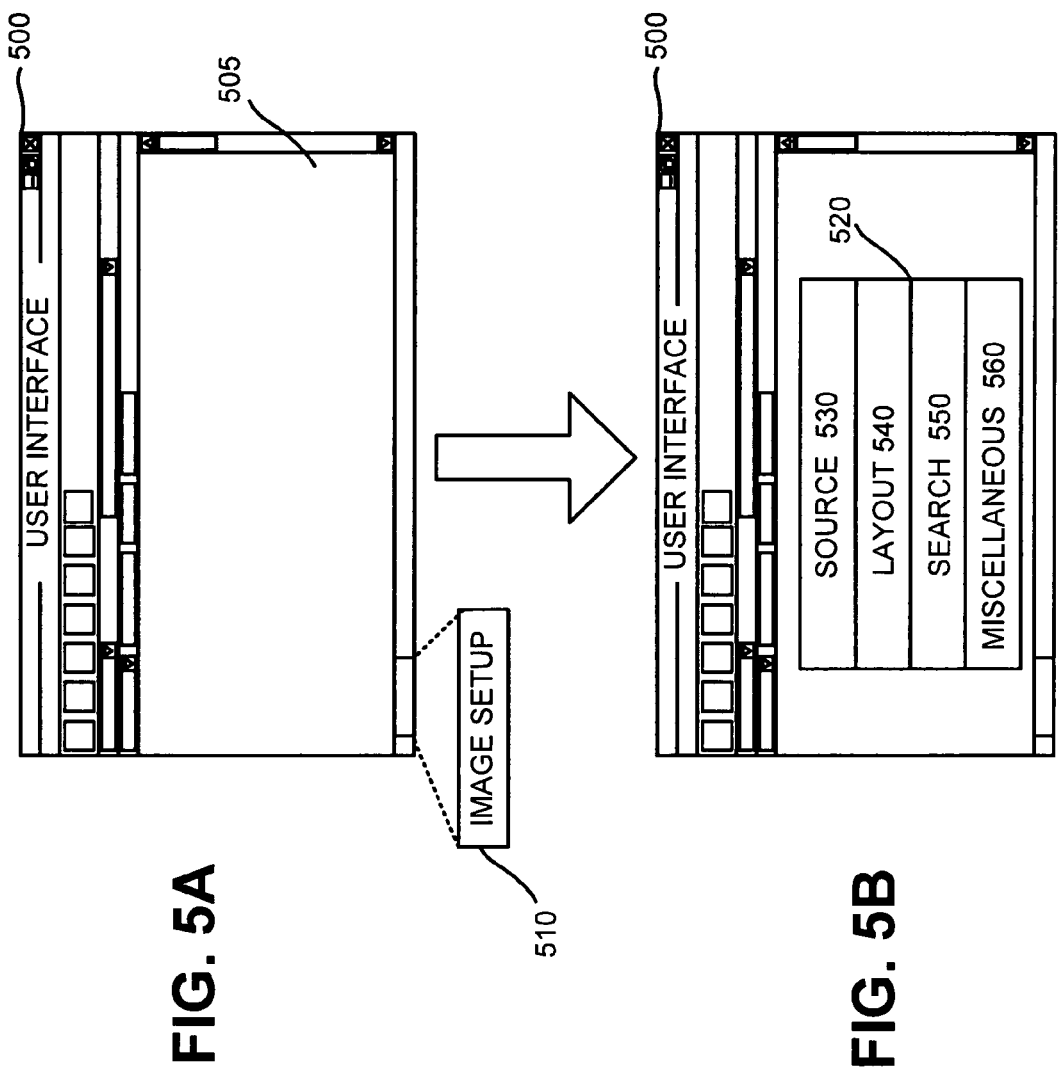

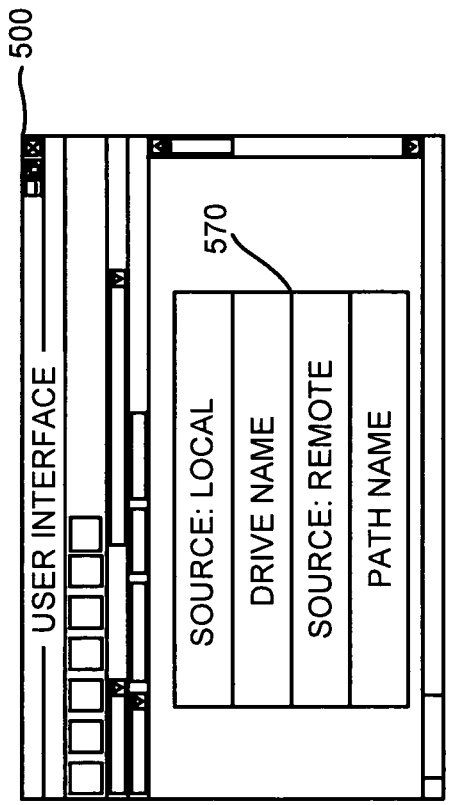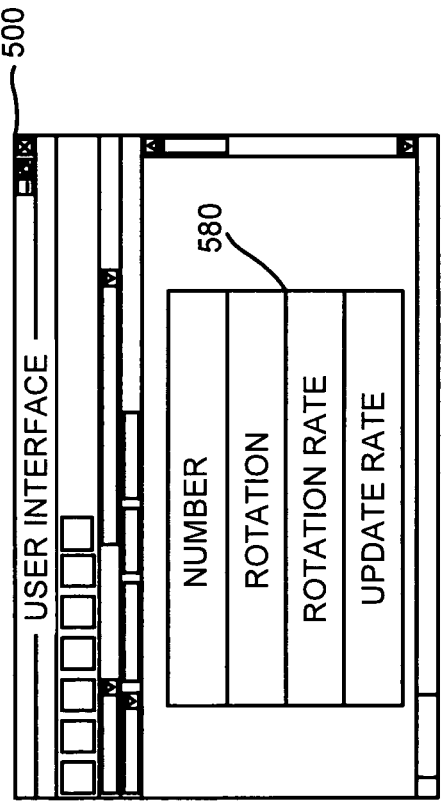
FIG. 5C
FIG. 5D

IMAGE MANAGEMENT

BACKGROUND

1. Field of the Invention

Implementations relate generally to the display of images on a display device and, more particularly, to the display of images in cooperation with a user interface operating on a client.

2. Description of Related Art

A network portal, such as a web portal, may be a web site that is designed as a starting point for a user's online activity. Web portals typically provide links to a number of other network resources.

Web portals may be personalized. For example, when a user views the portal, such as by starting an Internet browsing program with the portal set as the home page, the user may be presented with a web portal that the user previously customized. The user may have previously indicated, for example, that the portal should present quotes from a number of stocks the user follows, the weather forecast for a particular city, and an indication of the number of new messages in the user's web-based email account. The web portal provider stores this information, and when the user logs on, presents a web portal appropriate for the user.

As the starting point for online activity, having a user choose to use a particular web portal can be valuable to the provider of the web portal. Accordingly, when designing web portals, it is desirable that the web portal be as appealing to the user as possible.

SUMMARY

In accordance with an implementation, a server is provided. The server receives information from a user, where the information designates one or more images that the user is interested in seeing when viewing a web portal. The server stores the received information. The server generates a web page that includes links to one or more of the designated images based on the stored information, where the web page is generated when the user visits the web portal. The server sends the generated web page to the user.

In accordance with another implementation, a user interface is provided. The user interface receives parameters on behalf of a user to facilitate control of a group of images that are to be displayed within a web page associated with a web portal, where a portion of the group of images are stored at a remote server and included in the web page via a group of links. The user interface receives the web page including the group of links from the server and displays the web page. The user interface selects at least one of the group of links on behalf of the user and provides at least one of the group of images that is associated with the selected at least one of the group of links to the web page according to the received parameters. The user interface displays the selected at least one of the group of images within the web page according to the received parameters.

In accordance with yet another implementation, a computer readable medium that stores instructions executable by a server is provided. The computer readable medium includes instructions for causing the server to receive a request on behalf of a user interacting with a web portal. The computer readable medium includes instructions for causing the server to process a link identified in the request, where the link is associated with an image specified by the user. The computer readable medium includes instructions for causing the server to provide the link to the user, where the link is used by the user to view the requested image within a web page associated with the web portal.

In accordance with still another implementation, a method is provided. The method includes receiving information from a user designating one or more images that the user is interested in seeing when viewing a web portal and storing the received information. The method includes generating, when the user visits the web portal, a web page that includes links to one or more of the designated images based on the stored information and the method includes transmitting the generated web page to the user.

In accordance with yet another implementation, a server is provided. The server includes means to receive information from a user, where the information designates one or more images that the user is interested in seeing when viewing a web portal and means to store the received information. The server includes means to generate a web page that includes links to one or more of the designated images based on the stored information, where the web page is generated when the user visits the web portal. The server includes means to send the generated web page to the user. The server includes means to provide the user with one of the one or more designated images based on a request associated with one of the links to the one or more designated images.

In accordance with a further implementation, a server is provided. The server includes a memory to store a group of links associated with a group of images. The server includes a processor to request authentication information from a client device and to process the authentication information to validate an identity associated with a user of the client device. The processor provides a web portal to the client device that includes links to a subset of the group of images, the subset being determined based on user-defined parameters associated with the validated identify of the user when the identity is validated, where the web portal facilitates display of images on the client device via a web page. The processor provides the group of links to the client device via the web page. The processor provides links to the subset of the group of images to the client device in response to the request, where the requested subset of the group of images is displayed within the web page according to user-defined parameters.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5A-F are exemplary diagrams of user interfaces that illustrate exemplary menus that can be used to configure an image application that can be used to perform image-based operations in conjunction with a user interface;

DETAILED DESCRIPTION

The following detailed description of the invention refers to the accompanying drawings. The same reference numbers in different drawings may identify the same or similar elements. Also, the following detailed description does not limit the invention.

Overview

Figure 1:
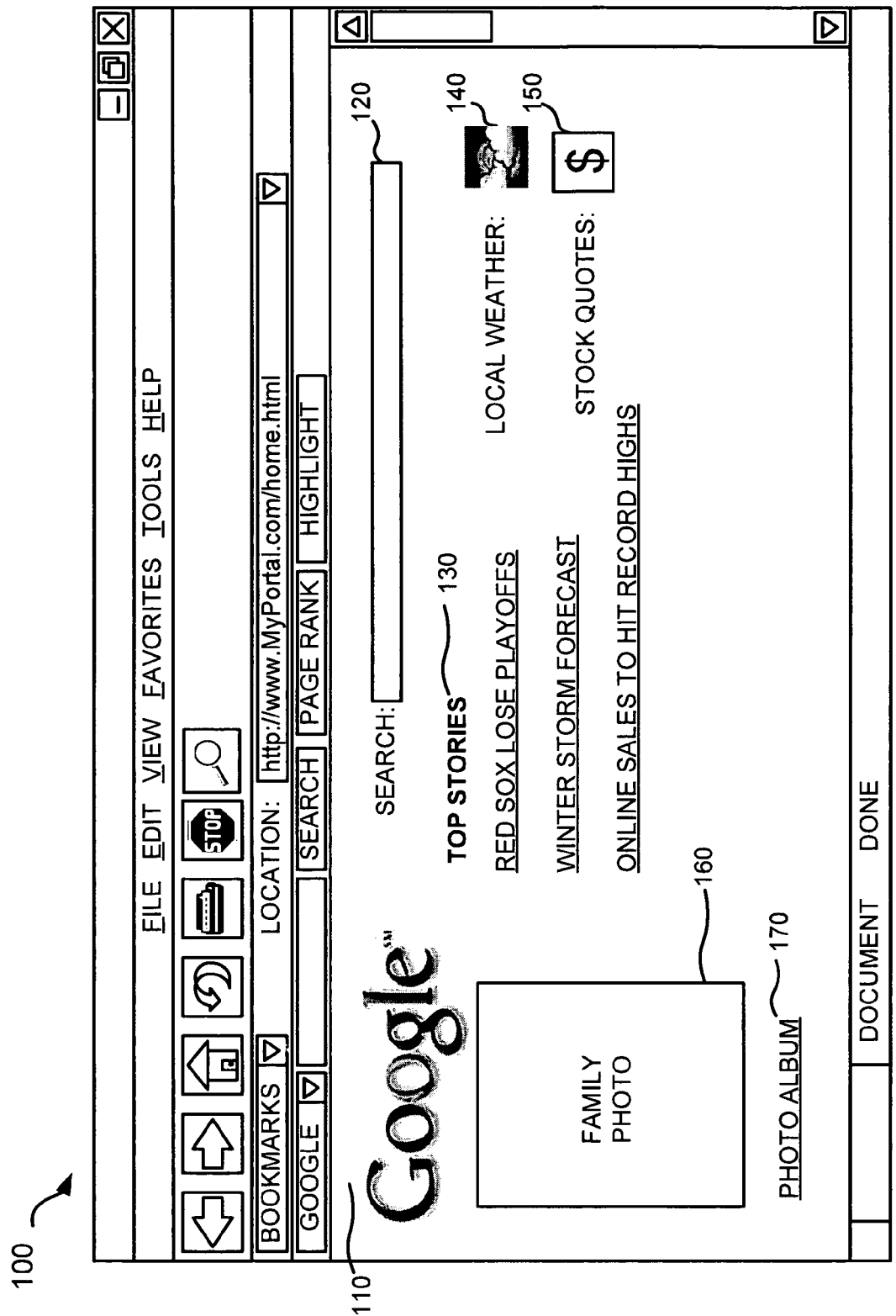
FIG. 1 is an exemplary diagram of a user interface consistent with the principles of the invention.

FIG. 1 is an exemplary diagram of a user interface 100 consistent with the principles of the invention. In this example, user interface 100 may be displayed by a web browser that is displaying a web page 110. Web page 110 may be a web portal, which, as this term is used herein, refers to a document (e.g., web page), that is designed to include links to online and/or local resources. Typically, a web portal is the first web page displayed by the web browser when it is opened.

As shown in this example, web page 110 presents a number of pages of information to the user, including a search bar 120, a "top stories" section 130, a weather section 140, and a stock quote section 150. Consistent with an aspect of the invention, web page 110 may also include image 160 and photo album 170.

Image 160 may be an image that is in some way designated by the user. For example, image 160 may be an image that is selected from a set of images stored locally at the user's computer, an image that is selected from a set of images stored online, or an image stored by the provider of the web portal. Image 160 may also be configured to intermittently change, such as by displaying a new image 160 each time the user visits web page 110.

Photo album section 170 may provide a link to stored images that can be loaded into web page 110. For example, photo album section 170 may provide the user with a link to remotely stored images, such as images stored by the provider of web page 110, or to local images, such as images stored on a hard drive in the user's computer. Photo album 170 may provide image 160 and/or may provide other images that can be displayed in web page 110 according to user defined parameters.

By allowing users to customize web page 110 to include images chosen by the user, the web portal may advantageously be more appealing to users.

Exemplary Network Configuration

Figure 2:
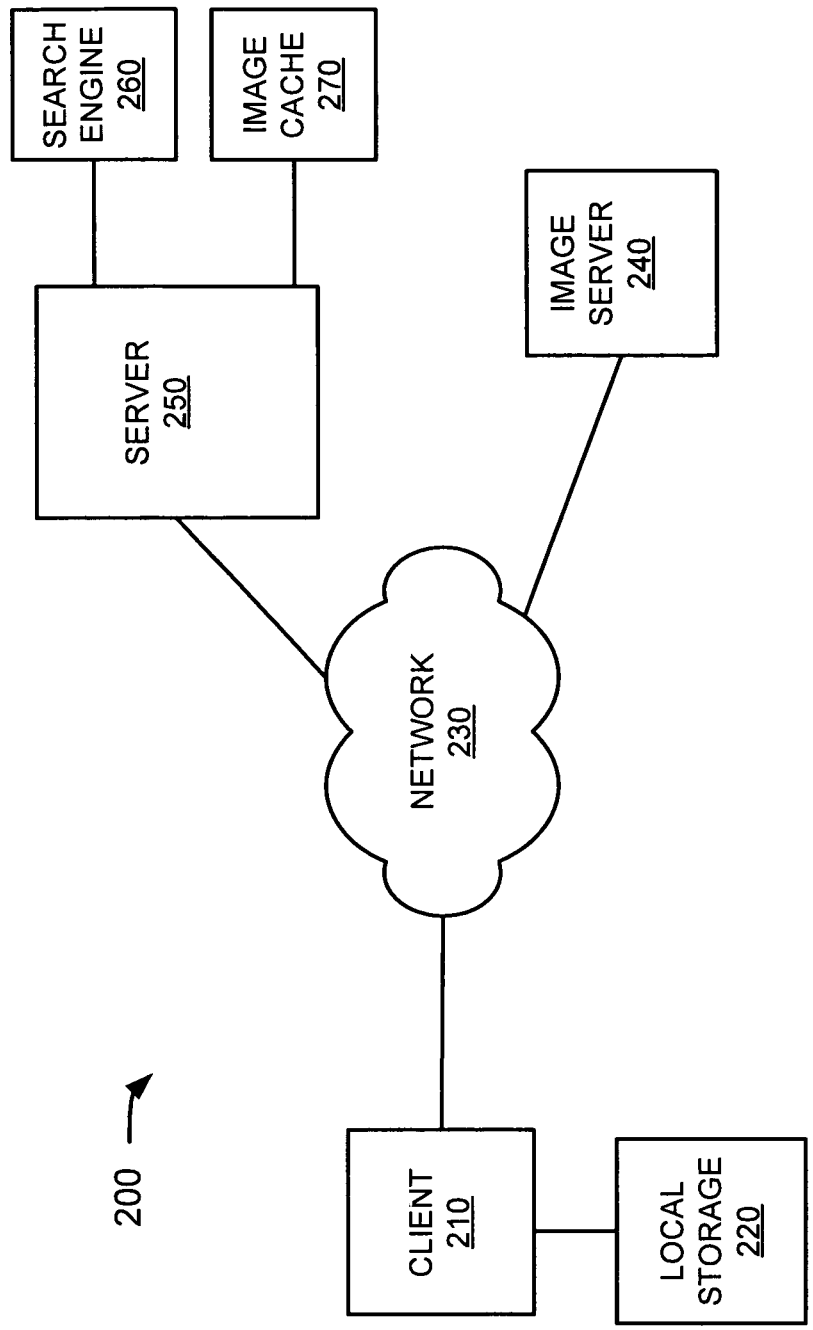
FIG. 2 is an exemplary diagram of a network in which systems and methods consistent with the principles of the invention may be implemented.

FIG. 2 is an exemplary diagram of a network in which systems and methods consistent with the principles of the invention may be implemented. Network 200 may include a client 210, local storage 220, a network 230, an image server 240, a server 250, a search engine 260, and an image cache 270. Client 210 may connect to multiple servers, such as image server 240 and/or server 250, via a network, such as network 230. One client 210, one image server 240, one server 250 and one network 230 are illustrated for simplicity. In practice, there may be more or fewer clients, servers and/or networks. Also, in some instances, a client may perform a function of a server and/or a server may perform a function of a client.

Client 210 may include one or more devices capable of processing machine-executable instructions to interact with a user interface and to provide images to a user. Client 210 may be a device, such as a personal computer, a wireless telephone, a personal digital assistant (PDA), a laptop, and/or another type of computation and/or communication device. Client 210 may also include a thread and/or process running on one of these devices, and/or software objects executable by one of these devices. For example, client 210 may be configured to request an image from image server 240 via network 230.

An "image" as used herein, is to be broadly interpreted to include any reference to an image in any form. The image may originate from a local source on a client device and/or may originate from a remote device, such as an image server. An image may include, for example, visual content, such as digital photographs, may include visual content in combination with audible content, such as multimedia clips, and/or may include visual content that includes references to other information, such as a link to a remote web site. An image may operate in association with an image application to facilitate presenting the image to a user interface according to user defined parameters.

An "image application," as used herein, is to be broadly interpreted to include a software-based application that operates with images. An image application may operate alone or in combination with general-purpose and/or specialized hardware, such as image processing hardware. An image application may operate to manipulate images within a display area, such as a display area associated with a web page. Images may be manipulated via operations performed by the image application, such as cropping an image, moving an image, copying an image, and/or sending and receiving images to/from other devices. Implementations of an image application consistent with the principles of the invention may operate alone or with other applications, such as a portal application or web browser. An image application may be provided to a client from a remote site, such as via a server, and/or may be provided locally, such as via a hard drive on client 210.

Local storage 220 may include one or more devices capable of storing information on behalf of client 210 or a user thereof. For example, local storage 220 may include a hard disk drive, a CD-ROM drive, a flash memory, etc. Local storage 220 may be used to store images for display within a display area associated with client 210 and/or that will be shared with another application, such as an email application operating on client 210, and/or another device, such as a remote computer.

Network 230 may include any type of network capable of carrying data. For example, network 230 may include a local area network (LAN), a metropolitan area network (MAN), a wide area network (WAN), a telephone network, such as the Public Switched Telephone Network (PSTN), an intranet, the Internet, and/or a combination of networks. Client 210, image server 240 and/or server 250 may connect to network 230 via wired, wireless, and/or optical connections.

Image server 240 may include one or more devices capable of providing images or other data to another device. Image server 240 may include a server, a desktop computer, a laptop computer and/or a dedicated processing device that is configured to provide images to a requesting device, such as client 210. Image server 240 may include databases, search engines, storage devices, and/or specialized application software to maintain images in a format that is compatible with client 210, network 230 and/or server 250. Image server 240 may be implemented in a standalone configuration and/or a distributed configuration. In one implementation, image server 240 may provide RSS (really simple syndication) feeds to client 210. The RSS feeds may include images that periodically change.

Server 250 may be implemented in a standalone configuration and/or a distributed configuration. As illustrated, server 250 may be associated with or provide functionality of a search engine 260 and/or an image cache 270 consistent with the principles of the invention. Search engine 260 and image cache 270 may be located within server 250 or external to server 250.

Search engine 260 may include one or more hardware and/or software modules that provide a user with a search capability. For example, search engine 260 may allow a user to search a corpus of documents and/or images using a search query describing information of interest to the user. In response to the search query, the user may receive documents, images, and/or links to documents or images.

A "link," as the term is used herein, is to be broadly interpreted to include any reference to/from a document and/or location.

A "document," as used herein, is to be broadly interpreted to include any machine-readable and machine-storable work product. A document may be an e-mail, a business listing, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Image cache 270 may include one or more devices capable of storing a group of images. For example, image cache 270 may include a storage device and/or processing hardware to facilitate storage, retrieval, and/or cataloging of images. Image cache 270 may operate with server 250 to provide for the efficient delivery of images from server 250 to client 210. For example, if client 210 requests an image, the requested image may have to traverse an entire network when going from image server 240 to client 210. In contrast, image cache 270 may be associated with a server that is located closer to client 210 on the network, as compared to image server 240. Therefore, if client 210 receives an image via image cache 270, network loading and/or delivery time may be less than if image server 240 provided the image directly to client 210. Image cache 270 may also provide redundancy in the event of a failure associated with image server 240. Image cache 270 may be configured to store copies of all images associated with image server 240 or a subset of images associated with image server 240. In one implementation, image cache 270 may be configured to store only copies of images that have been previously requested by client 210 within a determined time period, such as within a certain number of hours and/or days.

While, image server 240 and server 250 are shown as separate entities, it may be possible for image server 240 to perform one or more of the functions of server 250 and for server 250 to perform one or more functions of image server 240.

Exemplary Client/Server Architecture

Figure 3:
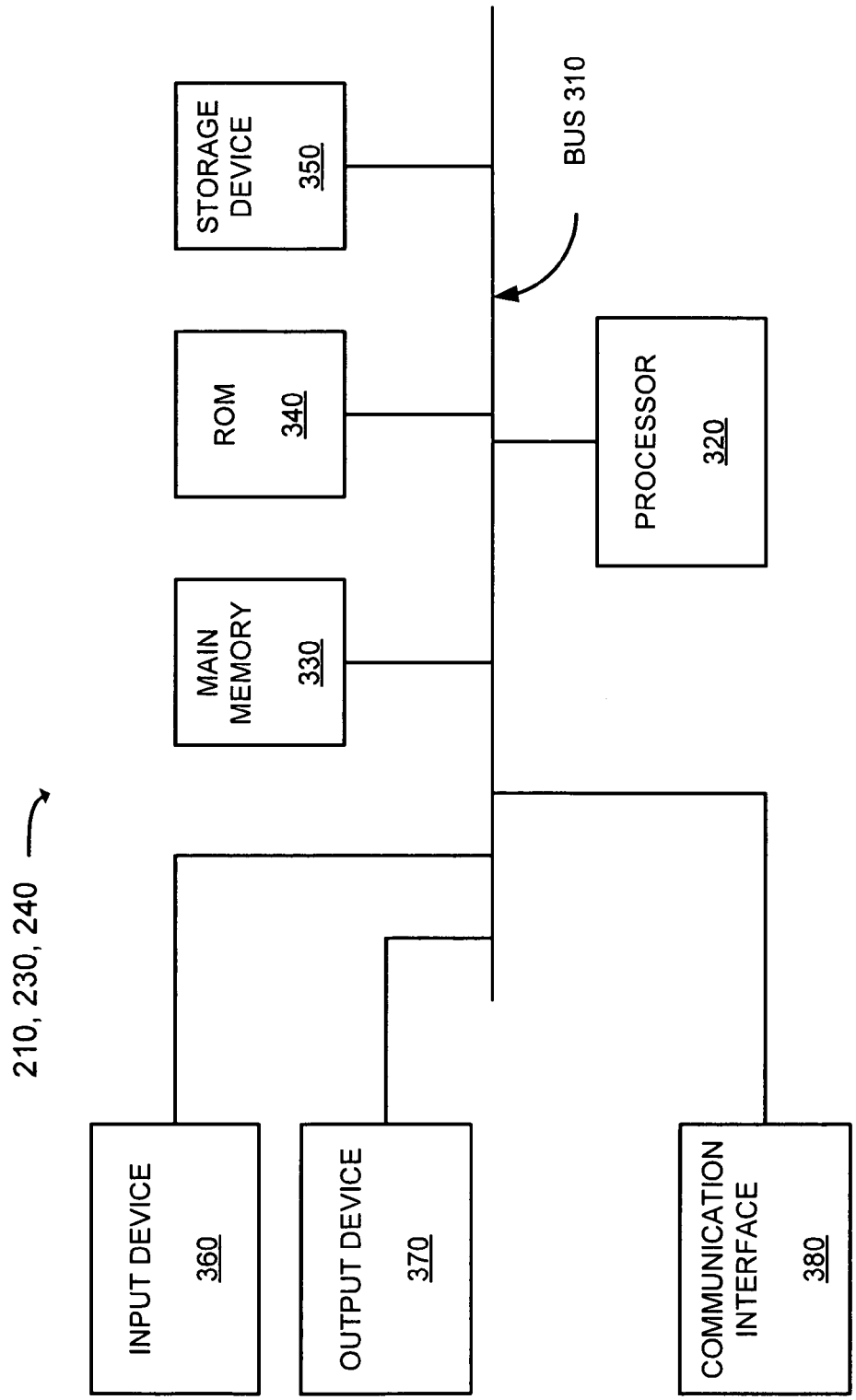
FIG. 3 is an exemplary diagram of a client or server of FIG. 2.

FIG. 3 is an exemplary diagram of a client or server of FIG. 2. A client or server entity (hereinafter called "client/server entity") may correspond to one or more of client 210, image server 240, and/or server 250. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive. One or more of main memory 330, ROM 340, or storage device 350 may be implemented as local storage 220, illustrated in FIG. 2.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain image related functions. The client/server entity may perform these operations in response to processor 320 executing software instructions contained in a computer-readable medium, such as memory 330. A computer-readable medium may be defined as a physical or logical memory device and/or carrier wave.

Software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and/or software.

Exemplary User Interface Setup

Figure 4:
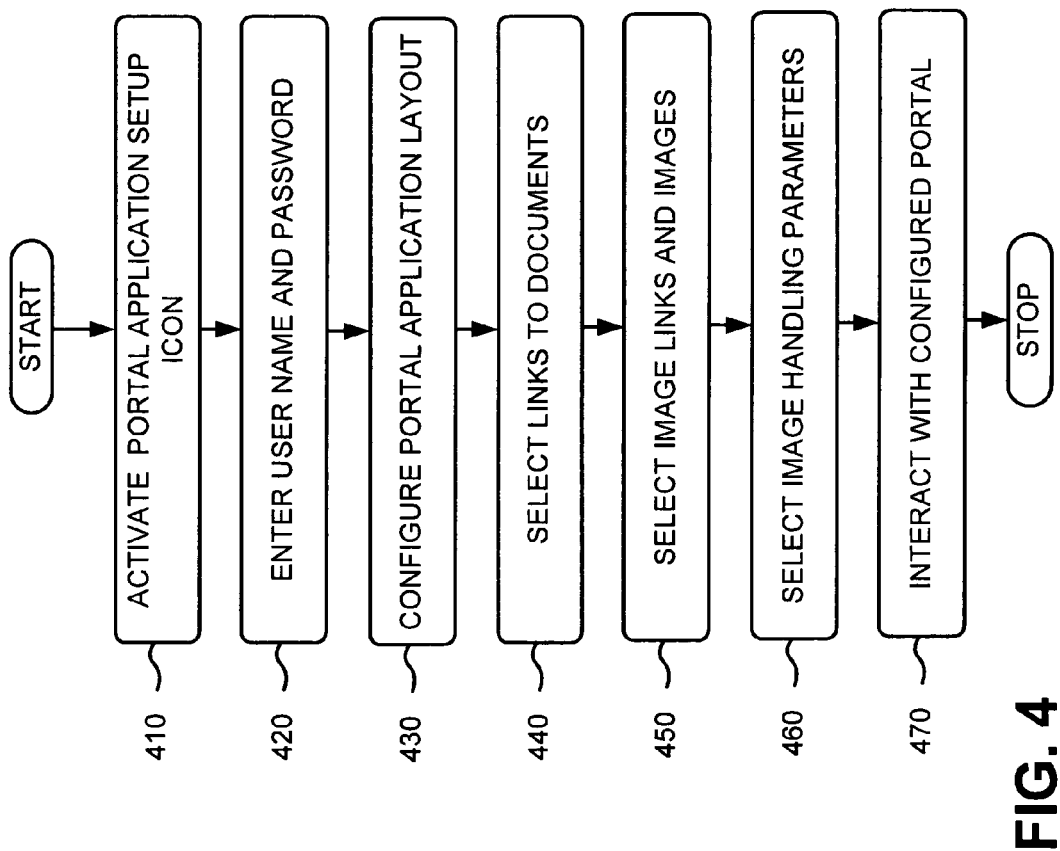
FIG. 4 is a flowchart of an exemplary process for setting up a user interface consistent with the principles of the invention.

FIG. 4 is a flowchart of an exemplary process for setting up a user interface consistent with the principles of the invention. A user interface, such as a web portal, may be configured by a user prior to performing operations such as accessing content. Content may include, for example, documents, video clips, audio files and/or images. A user may activate an icon, or link, to access a portal application (act 410). For example, a desktop may include an icon that is associated with a link to a portal application that is provided via server 250. A user may click on the icon to cause the portal application to operate on the user's behalf. The portal application may provide information to the user via a user interface. For example, the portal application may provide a series of web pages to the user in response to user inputs.

The user may enter a user name and password to establish an identity of the user with the portal application (act 420). Entering a user name and password may provide the user with access to the portal application. For example, the user may be presented with a web page after the user's identity is validated. A validated user may be allowed to access local and/or remote content via the web page. In addition, implementations consistent with the principles of the invention may allow the user to customize aspects of the web page, such as the layout of the web page, organization of information displayed in the web page, and the selection of parameters to facilitate user defined operations in association with the web page. For example, a user may customize a user interface by identifying where in a display area various types of information are displayed, by identifying colors and/or patterns for display backgrounds, and by identifying types of content that should be displayed via the web page.

The user may configure the layout of the portal application (act 430). Assume that the portal application provides the user with a series of web pages that let the user determine how various types of information are displayed to the user when the user interacts with the user interface. For example, the user may indicate that a search window should be located at a top portion of a web page, stock market information should be located along a right side of the web page, local weather information should be located along a bottom portion of the web page, and images and image related information should be located along a left side of the web page.

The user may select links to documents after configuring the layout of the portal application (act 440). For example, the user may identify specific stock quotes to display along the right side of the web page. Server 250 may insert content corresponding to the stock quotes or links to the content when delivering the portal to the user. The user may also select links to streaming content, such as news feeds. For example, the user may configure links to sites that provide content via really simple syndication (RSS) feeds.

The user may select images and links to images to display in conjunction with the portal application (act 450). For example, the user may provide references (e.g., local or remote links) to a number of images the user is interested in. In addition, the user may select a number of image links to display proximate to the displayed image. Image links may be associated with local or remote images. For example, the user may provide an image link that is associated with an image maintained on server 250. Server 250 may provide a web page to the browser that includes the link. The browser may get the image via the link and render the image to the web page for a user of client 210. Image links associated with local images may be provided to the web page via server 250. The image may then be retrieved off local storage 220 and rendered in the web page. The user may make additional selections that further control how images are handled in conjunction with the user interface.

The user may select image handling parameters associated with images and image links (act 460). For example, the user may specify parameters that may be used to control the display of images within the web page, to search for remote images, to specify the content of displayed images, to specify refresh rates for displayed images, etc. Server 250 may generate a web page to facilitate establishing image parameters on the user's behalf. Assume that the user specifies a series of images that should be displayed within the web page. Server 250 may generate a script that, when executed at the client, causes the series of images to be displayed in accordance with parameters specified by the user.

After setting up the portal application, the user may interact with a customized implementation of the portal, such as the web page described above (act 470). For example, the user may interact with a web page that displays a family picture and links to other user defined images along a left side of the web page. The user may access images associated with these image links by clicking on one or more of the links. Clicking on a link may cause the client to render the image associated with the link.

Server 250 may store configuration information associated with user interfaces. For example, server 250 may save parameters associated with a user interface that has been configured by a user consistent with the principles of the invention. When a user activates an icon or a link associated with the user interface, server 250 may render the user interface on a client 210 according to the stored parameters. A user may be able to access his/her customized user interface via any computer using his/her identification information. When a user logs off of the user interface, information associated with the user interface may be deleted from the device on which the user interface was displayed to prevent other persons from accessing the user's settings or personal information.

Exemplary Implementation

FIGS. 5A-F are exemplary diagrams of user interfaces that illustrate exemplary menus that can be used to configure an image application that can be used to perform image-based operations in conjunction with a user interface. The user interface may, for example, correspond to a web browser window that may be used to access local and/or remote content, such as documents, images, audio and/or video. The user interface may, alternatively, correspond to a desktop on client 210. For explanatory purposes, it is assumed hereinafter that user interface corresponds to a web browser window. In either of the above situations, the user interface application may facilitate the manipulation of images within a display area associated with the user interface.

In accordance with an implementation of FIG. 5A, user interface 500 may include a display window 505 and image setup toolbar button 510 (hereinafter setup button 510). Setup button 510 may be used to launch an image application. For example, a user may activate the image application by selecting (e.g., clicking on) setup button 510. Setup button 510 may be an add-on toolbar that is operatively associated with the image application. The add-on toolbar may provide access to one or more search boxes, software buttons, and/or menu elements that are selectable by a user to initiate functions associated with the image application.

According to another implementation, the image application may be implemented as a toolbar button of a web browser toolbar, an icon, a link, a menu element, a pop up window element and/or other interactive mechanism for allowing a user to activate an image application. When setup button 510 is activated, a pop up window may be provided to a display window 505, as illustrated in FIG. 5B.

As illustrated in FIG. 5B, a pop up window may provide an image setup menu 520 in display window 505 in response to activating setup button 510. Setup menu 520 may include a number of entries, such as source 530, layout 540, search 550, and miscellaneous 560. Each entry may be further associated with sub-menus that can be activated by clicking on an entry 530-560 using, for example, a pointing device. Source entry 530 may let a user specify local or remote sources for images. Layout entry 540 may let a user specify a layout for images displayed within display window 505. Search entry 550 may let a user perform local or remote searches for images that can be displayed within display window 505. Miscellaneous entry 560 may let a user specify additional image operations and/or to control features associated with images that are not addressed by source entry 530, layout entry 540 and/or search entry 550.

FIG. 5C illustrates an exemplary source menu 570 that may be presented to a user in response to clicking on source entry 530. As illustrated in FIG. 5C, source menu 570 may include a local source entry, a drive name entry, a remote source entry, and a path name entry. A user may use the local source entry to identify a location in, for example, local storage 220 from which image files are to be retrieved.

The drive name entry may let the user specify a name of a directory and/or drive from which image files should be retrieved. The drive name entry may also be used to specify a location where downloaded images are to be stored for later use. For example, the user may specify that downloaded images are to be stored on local storage 220 and/or another location in client 210. The image application may retrieve images from a directory and/or drive identified in source menu 570.

The remote source entry may let a user specify a remote location from which images are to be retrieved. For example, remote images may be retrieved from image server 240 and/or server 250.

The path name entry may let a user specify a path name to retrieve remote images. For example, a path name may be a universal resource locator (URL) or an IP address. Remote images may be used on client 210 alone or in cooperation with locally retrieved images.

FIG. 5D illustrates an exemplary layout menu 580 that may be presented to a user in response to the user clicking on layout entry 540. Layout menu 580 may include a number entry, a rotation entry, a rotation rate entry, and an update rate entry.

The number entry may let the user specify the number of images to display within display window 505. For example, a user may specify that four images should be displayed within display window 505 at any given time.

The rotation entry may let the user specify that images rotate within display window 505. The rotation entry may also let the user specify a direction of rotation and/or an ordering for displayed images while the images rotate within display window 505. For example, if a user enters information in the rotation entry, an image rotation function may be activated. The user may enter information into the rotation entry that causes images to rotate in a clockwise direction and that causes an ordering of displayed images within the rotation pattern to change in, for example, a random fashion. The rotation direction may also operate to rotate images in other directions, such as from front-to-back within display window 505.

The rotation rate entry may let the user specify a rotation rate for images displayed within display window 505. For example, a user may specify that the clockwise rotating images, specified above, rotate at a rate that causes an image to change locations within the clockwise rotation every ten seconds. As an example, assume that a first image is at a first location in a clockwise rotation pattern within display window 505 and that a second image is at a second location within the rotation pattern. If the rotation rate is specified to be ten seconds, the first image will move to the second location ten seconds after being displayed at the first location. In one implementation, server 250 may transmit a script that is executed by the client, where the script controls the rotation rate and/or the number of images that are rotating within display window 505.

The update rate entry may let the user specify a rate at which images are updated within display window 505. For example, an update rate may be used to cause the image application to request additional images from, for example, local storage 220 at a determined interval, such as weekly, daily, hourly, etc.

Figure 5E:
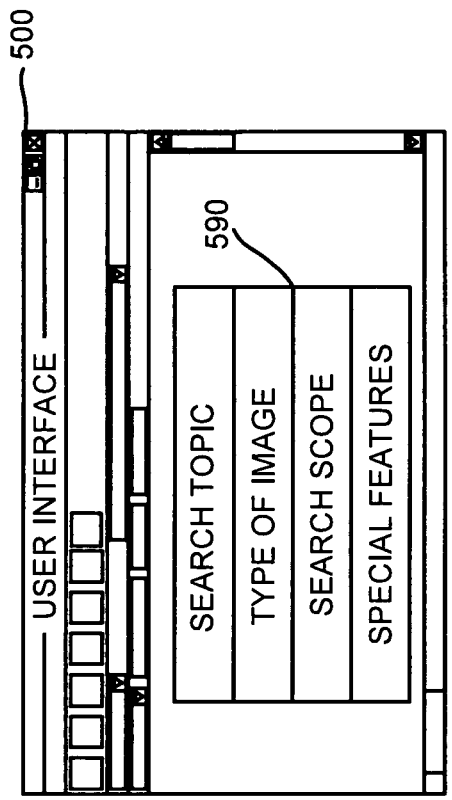

FIG. 5E illustrates an exemplary search menu 590 that may let a user perform searches associated with images and/or other data. Searches may be performed against a local source, such as local storage 220, or a remote source, such as image server 240 or server 250. Search menu 590 may be presented to a user in response to clicking on search entry 550. Search menu 590 may include a search topic entry, a type of image entry, a search scope entry, and a special features entry. Search topic entry may let a user enter one or more keywords associated with a topic. For example, if a user wishes to locate images associated with rose gardening, the user may enter "rose gardening" in the search topic entry.

The type of image entry may let a user specify the types of images that are desired. For example, a user may specify that images should be still images and/or video clips. In addition, the type of image entry may let a user specify a certain format, such as graphic image format (GIF) and/or joint photographic experts group (JPEG), for images received from a source.

The search scope entry may let the user specify a scope for a search. For example, a user may specify that only horticultural sites should be searched for images associated with rose gardening in order to reduce the chances of getting an undesired image. Alternatively, the user can specify "any" to have all available sites searched for images associated with rose gardening.

The special features entry may let the user specify unique features and/or criteria associated with searches. For example, the special features entry may let the user specify a size limit for images and/or may let the user establish a periodic interval on which a search is performed.

Figure 5F:
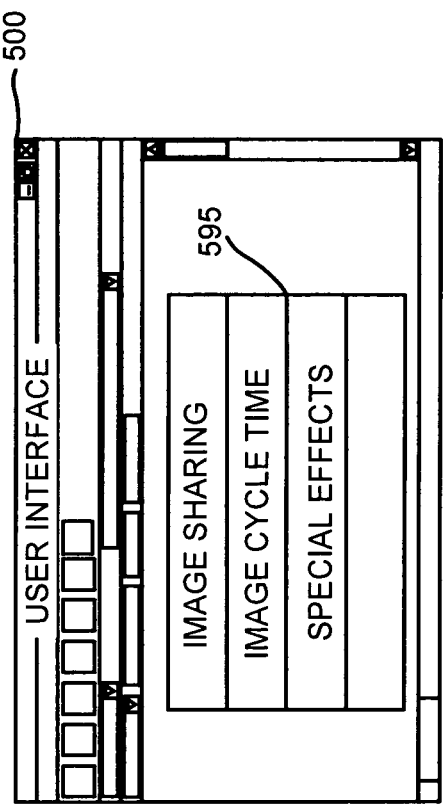

FIG. 5F illustrates a miscellaneous menu 595 that may be used to provide features and/or capabilities that may not be associated with source menu 570, layout menu 580, or search menu 590. Miscellaneous menu 595 may be presented to a user when the user clicks on miscellaneous entry 560. As illustrated, miscellaneous menu 595 may include an image sharing entry, an image cycle time entry and a special effects entry. The image sharing entry may cause client 210 to share images with another device and/or user.

The image cycle time entry may operate to let the user select a time interval at which images may be replaced with new images. The image cycle time entry may also operate to let the user specify an interval for storing images. For example, a user may specify that images should be archived from a volatile memory, such as a random access memory, to a remote storage device once per day.

The special effects entry may let the user specify certain characteristics and/or preferences for displayed images. For example, the special effects entry may let a user superimpose one image over another and/or may let the user modify images.

Figure 6A:
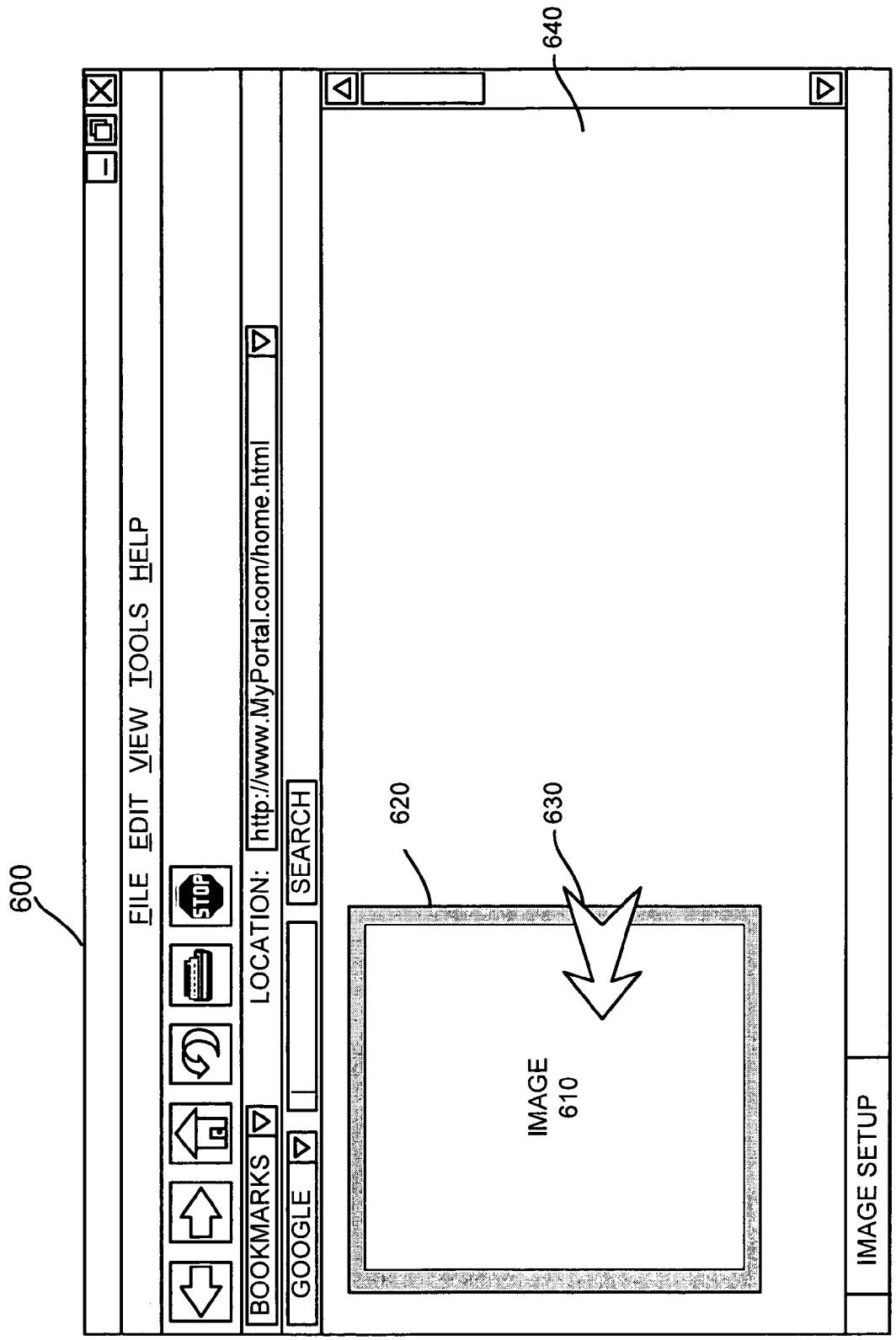
FIGS. 6A and 6B are exemplary diagrams of user interfaces that illustrate yet another implementation of the image application software operating on a client.
Figure 6B:
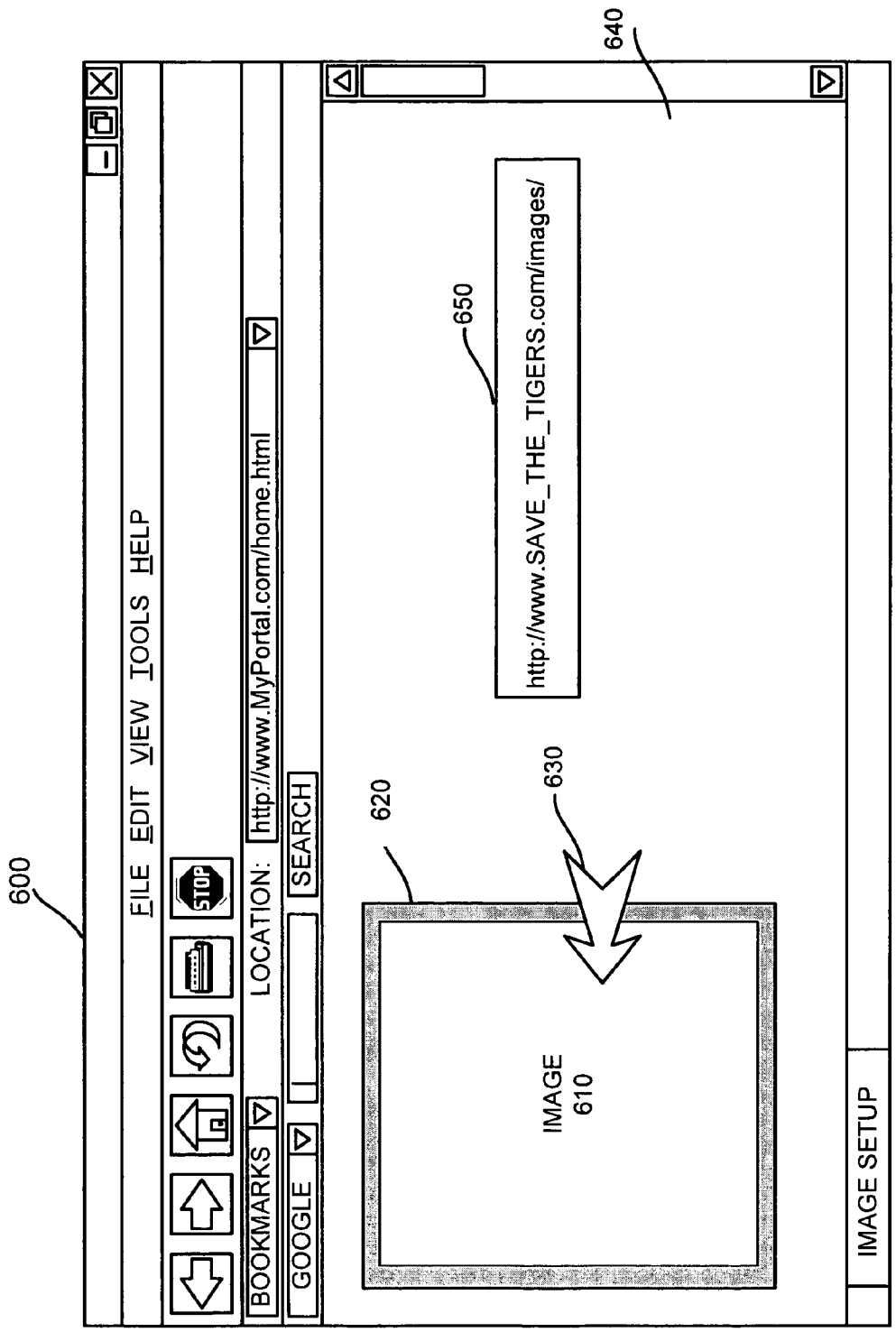

FIGS. 6A and 6B are exemplary diagrams of a user interface 600 that illustrate yet another implementation of the image application operating on client 210. User interface 600 may include an image 610, a border 620, a cursor 630 and a display window 640. Image 610 may be an image that contains a link to additional content, such as a link to a URL and/or a document. Image 610 may include a unique border 620 that operates to inform a user that image 610 is associated with additional content that may be accessed by performing an action.

Assume that image 610 has a border 620 that includes a pattern, where the pattern identifies image 610 as being associated with additional content, such as a document that is available via a remote web site. Further assume that the user moves a cursor 630 within display window 640 until cursor 630 is located over image 610. Further assume that the user performs an action, such as double clicking a mouse button, while cursor 630 is located over image 610. Double clicking while cursor 630 is located over image 610 may cause link window 650 to appear (FIG. 6B). Alternatively, link window 650 may appear whenever cursor 650 is positioned above image 610 in display window 640.

FIG. 6B illustrates an exemplary link window 650 that may be presented to a user in response to a user action. Link window 650 may include information, such as a URL. Information associated with link window 650 may be associated with additional content that may be related to image 610. For example, the user may depress an enter key to cause link window 650 to access additional content associated with a link displayed therein.

Assume that image 610 is associated with an endangered animal, such as a Siberian tiger. Further assume that image 610 is provided via an image server 240 that is associated with a non profit conservation group, such as the Wildlife Conservation Society. Further assume that the user clicks on image 610 and is presented with link window 650. If the user selects the link in link window 650, a document or a portion of a document corresponding to the link may be retrieved and presented to the user. The document may include information maintained on a web site operated on behalf of the Wildlife Conservation Society that describes the plight of the Siberian tiger shown in image 610. The accessed document may further provide the user with information about making donations that are used to help protect a habitat associated with the Siberian tiger. For example, the accessed document may include a link to an online payment application that accepts donations on behalf of Siberian tiger conservation efforts. In another implementation, clicking on image 610 may cause image server 240 to operate a script that provides a series of image links and/or images to client 210. For example, a series of images dealing with aspects of Siberian tiger habitats may be displayed in display window 640 in response to clicking on image 610.

Images used with implementations consistent with the principles of the invention may be associated with substantially any type of additional content via links or other techniques capable of associating one source of information with another source of information. For example, images may be associated with documents, video clips, additional images, audio files, software applications, financial information, and/or gaming applications via links.

The use of an image application in cooperation with user interface software provides users with the ability to customize the appearance of a display area that is associated with the user interface software. For example, a user may customize the appearance of a display window or a background of client 210 with images of the user's family. The use of family pictures may provide the user with a sense of comfort and/or emotional security while interacting with a client 210.

Web portal providers may use an image application to increase subscriber loyalty and/or to reduce the chance that a subscriber may switch to another web portal provider. The image application may increase subscriber loyalty because the subscriber may develop an attachment to the subject matter of displayed images, the types of displayed images, and/or the configuration of displayed images within a display area (e.g., a display window or a desktop background). If a competing web portal provider cannot present the subscriber with user interface software that offers the same look and feel and/or the same types of images to which the subscriber is accustomed with his/her current web portal provider, the subscriber may be less willing to change web portal providers. A web portal provider may use the image application as a marketing tool to attract subscribers. In addition, a web portal provider may use the image application as a subscriber retention tool for subscribers that already use the web portal and the image handling capabilities associated therewith.

An image application may be configured to interact with other software applications that operate on client 210, such as office applications, graphic arts applications, email applications, and/or gaming applications. When the image application is integrated with other software applications, the utility of the image application may be increased and/or subscriber loyalty to a service provider associated with the image application may be further increased.

Configuring Image Display

Figure 7A:
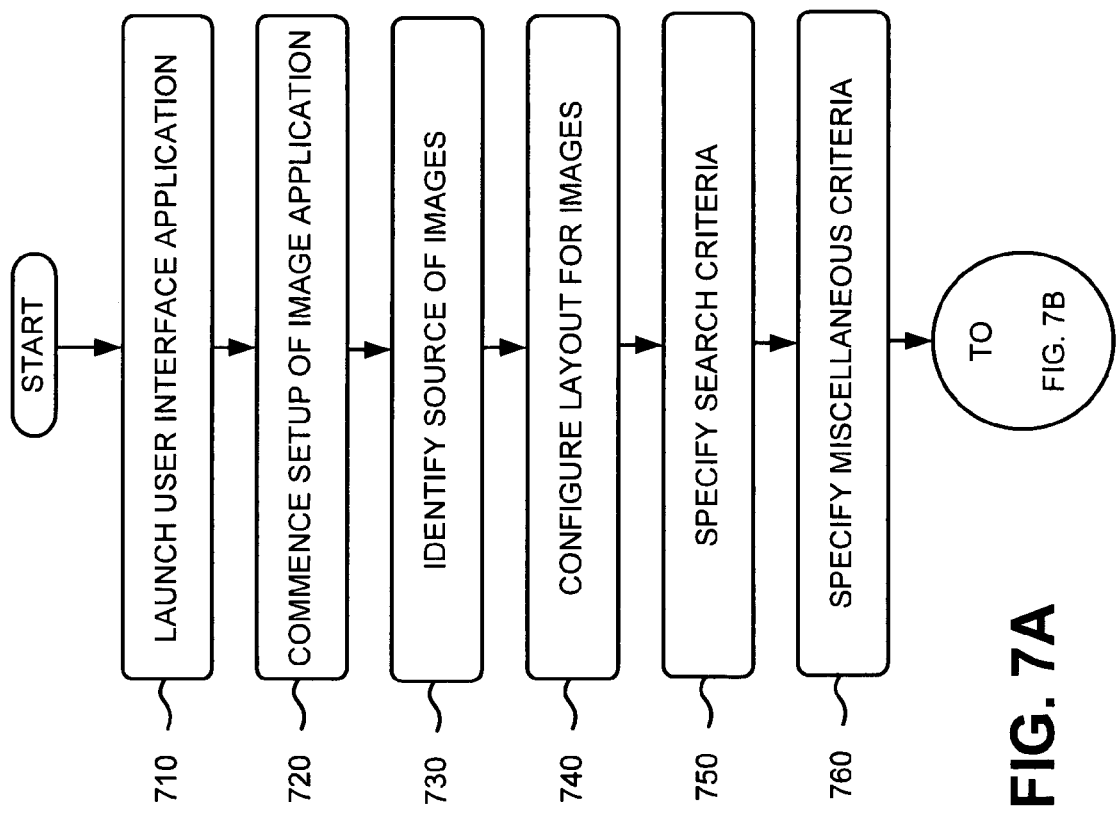
FIGS. 7A and 7B are a flowchart of an exemplary process for operating an image application in conjunction with a user interface to facilitate image-based operations.
Figure 7B:
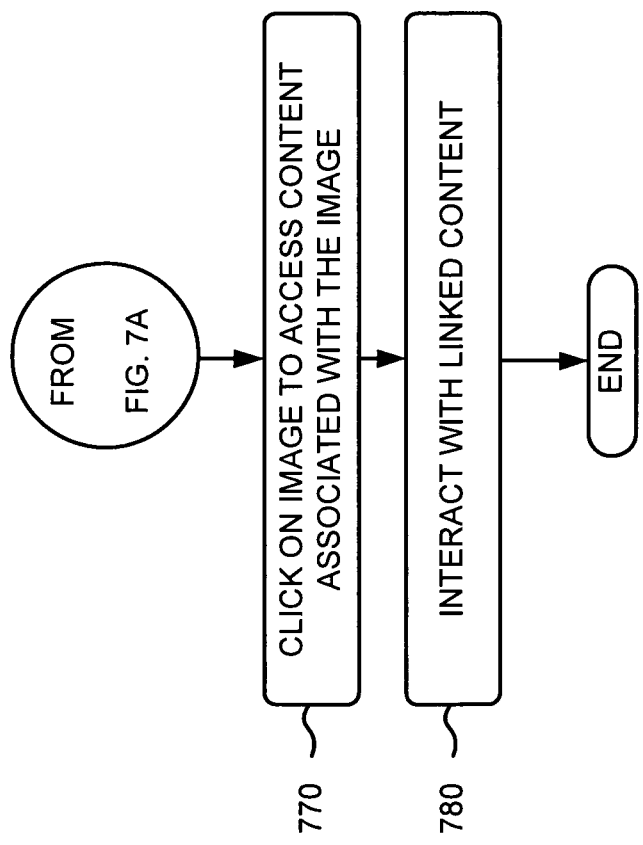

FIGS. 7A and 7B are a flowchart of an exemplary process for operating an image application in conjunction with a user interface to facilitate image-based operations. In one implementation, the processing of FIGS. 7A and 7B may be performed by one or more software and/or hardware components within client 210 or a server or by a combination of client 210 and a server.

Processing may begin when a user launches a user interface application (block 710). For example, the user may double click on an icon associated with a user interface application to launch user interface software. User interface software may be launched locally via software residing on local storage 220 and/or the user interface software may be launched remotely via server 250. If user interface software is launched remotely, client 210 may request software executable instructions from server 250. Server 250 may provide executable instructions to client 210 in response to the request. A user may enter a user name and/or password to activate the user interface software. After launching the user interface software, a user may be provided with a display such as the display shown in FIG. 5A.

User interface software may be used to facilitate access to an image application. A user may access the image application via an input device, such as a keyboard, pointing device and/or speech input device. The user may commence setup of the image application via user inputs provided to client 210 via the input device (block 720). For example, the user may double click on setup button 510 using a mouse. Double clicking on setup button 510 may cause a setup menu, such as setup menu 520 (FIG. 5B), to be presented to the user. Setup menu 520 may let the user select entries that can be used to configure the image application in a desired manner. Via setup menu 520, a user may access a number of submenus, as illustrated in FIGS. 5C-5F, to configure the types of images to be displayed and the manner in which the images are displayed in the display area.

A user may identify a source for images (block 730). For example, the user may click on source entry 530 and be presented with source menu 570 (FIG. 5C) via a pop up window. In cooperation with source menu 570, the user may select local and/or remote locations from which images are to be retrieved. For example, the user may have taken pictures with a digital camera during a family vacation and stored those pictures in local storage 220. The user may specify the particular folder in which those pictures are located via source menu 570. The image application may load images from the specified folder for display to the user in a display area, such as display window 505.

Implementations consistent with the principles of the invention may load images from remote sources, such as image server 240 and/or server 250. For example, a user may wish to obtain remote images via a streaming format, such as a format used for syndicating news and/or the content of news-like sites. For example, a user may obtain remote images via RSS image feeds. By making use of streaming protocols, such as RSS, a user may be able to use images from aggregating sites that accept feeds from multiple sources and make the aggregated information available to destinations. For example, server 250 may accept aggregated image data from a number of sources and may store the aggregated images in image cache 270. Client 210 may request a subset of the aggregated images from server 250 in cooperation with the image application.

Remote images provided to client 210 may come directly from an originating source, such as an image publisher that operates image server 240. Alternatively, remote images may be provided to client 210 via image cache 270. Image cache 270 may operate to provide images to client 210 in a manner that reduces network loading and/or delivery times as compared to providing images to client 210 directly from image server 240. As an example, assume that an image publisher operates an image server 240 in California. Further assume that client 210 is located in New York City. If client 210 requests images from the California-based image server 240, the images may traverse an entire network, such as the Internet, serving the United States. Further assume that server 250 operates image cache 270 in Ohio. Image cache 270 may cache copies of some or all images associated with image server 240 located in California. When client 210 requests images associated with the California-based image server 240, client 210 may be redirected to server 250 and/or image cache 270 located in Ohio. The requested images may be provided to client 210, located in New York City, from Ohio, thus reducing the network distance that the images must traverse en route to client 210. Image cache 270 may also offer redundancy in the event that the California-based image server goes off line and/or is overwhelmed, such as might occur if a denial of service attack is in progress against the image server located in California. Cached images may be provided to client 210 in a manner that is transparent to client 210, i.e., client 210 may not be able to tell from where the requested image was sent.

A user may configure a layout for the images (block 740). For example, the user may click on layout entry 540 (FIG. 5B) and be presented with layout menu 580 (FIG. 5D) via a pop up window. In cooperation with layout menu 580, the user may specify a number of images to be displayed within display window 505 at a given time, a manner in which displayed images are to move in display window 505, a speed at which displayed images rotate within display window 505, and/or an update rate that specifies a rate at which new images are to be displayed in display window 505. For example, the user may specify that the vacation images stored in local storage 220 should be displayed in groups of four images having a clockwise rotation. The user may also specify that the images should change location every ten seconds. The user may further specify that displayed images should be refreshed with new images from local storage 220 every five minutes. The user may further specify that new images should replace the removed images.

A user may specify search criteria for obtaining images to be displayed in display window 505 (block 750). For example, the user may click on search entry 550 (FIG. 5B). The user may be presented with search menu 590 (FIG. 5E) via a pop up window. In cooperation with search menu 590, the user may specify parameters associated with searches directed to images and/or other topics of interest to the user. For example, the user may wish to download pictures of a location that was visited for the family vacation discussed above. The user may want additional images of the vacation destination to augment the images downloaded from the digital camera. The user may enter the name of the vacation destination as a search topic and may specify an image type for downloading. The user may further specify a search scope. For example, the user may specify that images should come from entities situated at the vacation destination, such as hotels, local tour guides, and/or local chambers of commerce. The user may also specify special features, such as filtering criteria that may be used to prevent images associated with certain subject matter from being downloaded. For example, the user may specify that images showing the consumption of alcohol and/or tobacco be excluded from the search results.

Search criteria may be associated only with the preferences of a user at client 210 and/or may be associated with the preferences of a user at client 210 and/or other users of other client devices. For example, implementations consistent with the principles of the invention may employ collaborative filtering applications operating in conjunction with search menu 590. Collaborative filtering applications may use search preferences associated with a user of client 210 and/or search preferences associated with other users that have performed similar searches. Collaborative filtering applications may also accept information from the user regarding the user's tastes, interests, and/or preferences, such as by offering the user a questionnaire prior to performing a search on the user's behalf. Information, such as the user's tastes, interests, and/or preferences, may be processed along with a search query. This processed information may be used to provide the user with search results that better meet the needs of the user as compared to search results produced without the use of collaborative filtering techniques. Collaborative filtering capabilities may be provided locally at client 210 and/or may be provided to client 210 via a remote device, such as image server 240 and/or server 250. Searches specified by a user of client 210 may be performed locally on client 210, remotely on networked devices, or in combination using local and remote devices.

A user may specify miscellaneous criteria for displaying images (block 760). For example, the user may click on miscellaneous entry 560 (FIG. 5B) to cause a miscellaneous menu 595 (FIG. 5F) to appear. In cooperation with miscellaneous menu 595, the user may specify actions such as image sharing and/or special effects. For example, the user may specify, as a special effect, that images pass over each other as the displayed images rotate within display window 505. Miscellaneous menu 595 may let the user interact with other applications, such as an image editing program. The image editing program may let the user change and/or manipulate the content of images and or to combine images.

Images may be displayed within display window 505 according to user defined criteria that may be specified in blocks 730-760 (FIG. 7A). For example, images may move about display window 505 according to the user defined criteria. In one implementation consistent with the principles of the invention, a user may click on a displayed image to access additional content associated with the image (block 770, FIG. 7B). For example, a displayed image may include a unique border 620 (e.g., as illustrated in FIG. 6A). Border 620 may indicate that the image is associated with additional content, such as a link to a web site containing additional images and/or documents. The user may, for example, click on a portion of the displayed image to open a link window 650 within display window 505. The user may enter additional information, such as text and/or may select the information displayed within link window 650. For example, the user may depress an enter key to select information presented in link window 650. Alternative implementations may send the user directly to linked content without opening link window 650 when the displayed image is selected via a pointing device. Linked content may be static, such as a document that does not contain any links, and/or may be interactive, such as a questionnaire, a document that includes additional links and/ or an online game that requires user interaction.

A user may interact with linked content associated with the destination (block 780). For example, the user may read a document that is referenced by the link. The document may provide additional information about the image and/or a publisher or owner of the image. The document may further include links to additional content that may be available for the user.

EXAMPLE

FIGS. 8A-8D are diagrams illustrating an exemplary user interaction with a user interface. A user may launch user interface software via clicking on a user interface application icon associated with a display area on client 210. When the icon is activated, a web page 800A (FIG. 8A) may be made available to the user. Web page 800A may include display window 802 that may include a search window 804 and a portal setup button 806. Search window 802 may let the user perform web based and/or local searches. Portal setup button 806 may allow the user to setup a web portal capable of displaying image links and images with a web page consistent with the principles of the invention. For example, the user may click on portal setup button 806 using a pointing device, such as a mouse.

The user may be presented with a web page that allows the user to configure a home page that can be used as a web portal. For example, FIG. 8B illustrates an exemplary web page 800B that can be used to configure the home page. Link setups 808-814 may let the user set up news links, weather links, stock links and image links. Image link setup 814 may also let the user setup image handling parameters. Assume that the user clicks on news links setup 808. In response to the user's action, news link window 808A may be presented to the user via display window 802. Window 808A may include fields that let the user enter links for news topics of interest. For example, the user can enter www.cnn.com/top_stories in one of the fields associated with window 808A to receive news stories. Window 808A may also include a browse button 816 that lets the user browse for available news links. Links located via the browse function may be selected so they appear in window 808A. Links appearing in window 808A may be displayed in the configured home page.

The user may perform operations similar to those described in connection with news links setup 808 using weather links setup 810 and stock links setup 812. Image links setup 814 may let the user select image links, images, and image handling parameters. For example, the user may be presented with window 814A (FIG. 8C) via web page 800C when the user clicks on image links setup 814. The user may enter image links in window 814A or may browse for available image links and/or images using browse button 816A. The user may also select image handling parameters via entries associated with setup menu 520 that was discussed in connection with FIGS. 5B-5F. For example, the user may select source entry 530 to cause the image handling application to select images based on the links displayed in window 814A and/or from local storage 220. Layout entry 540 may allow the user to select a number of images to display in display window 802, whether the images should rotate within display window 802, a rotation direction for images and/or rotation rate for rotating images. For example, the user may specify that four images should be displayed in display window 802, and that the images should rotate in a clockwise direction within display window 802. Search entry 550 may allow the user to perform specified searches for image links and/or images using user defined criteria. For example, search entry 550 may allow the user to perform sophisticated searches for local and/or remote image links and/or images according to user defined criteria. Miscellaneous entry 560 may let the user specify other features such as image sharing and/or special effects.

Figure 8A:
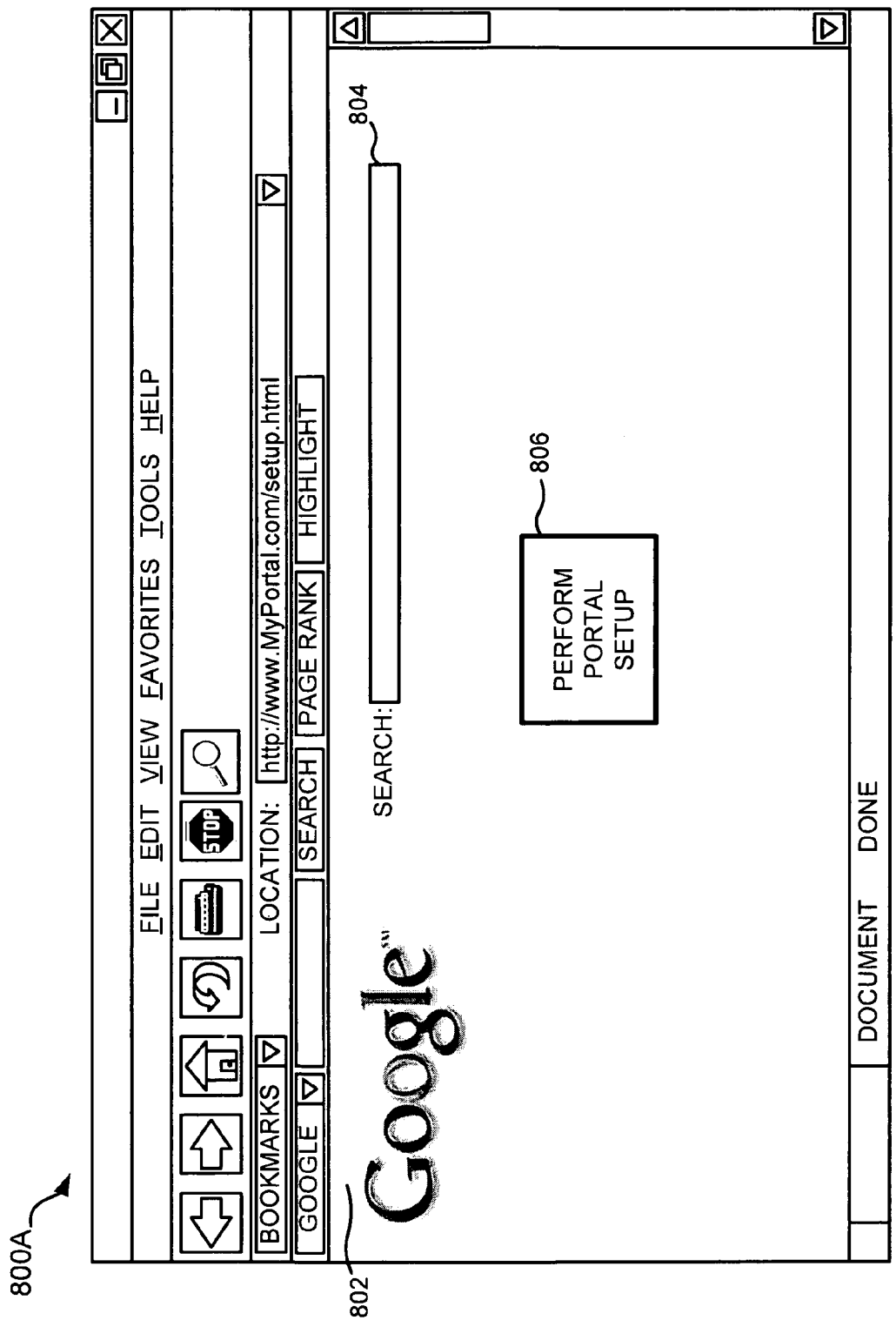
FIGS. 8A-D are diagrams illustrating an exemplary user interaction with a user interface.
Figure 8B:
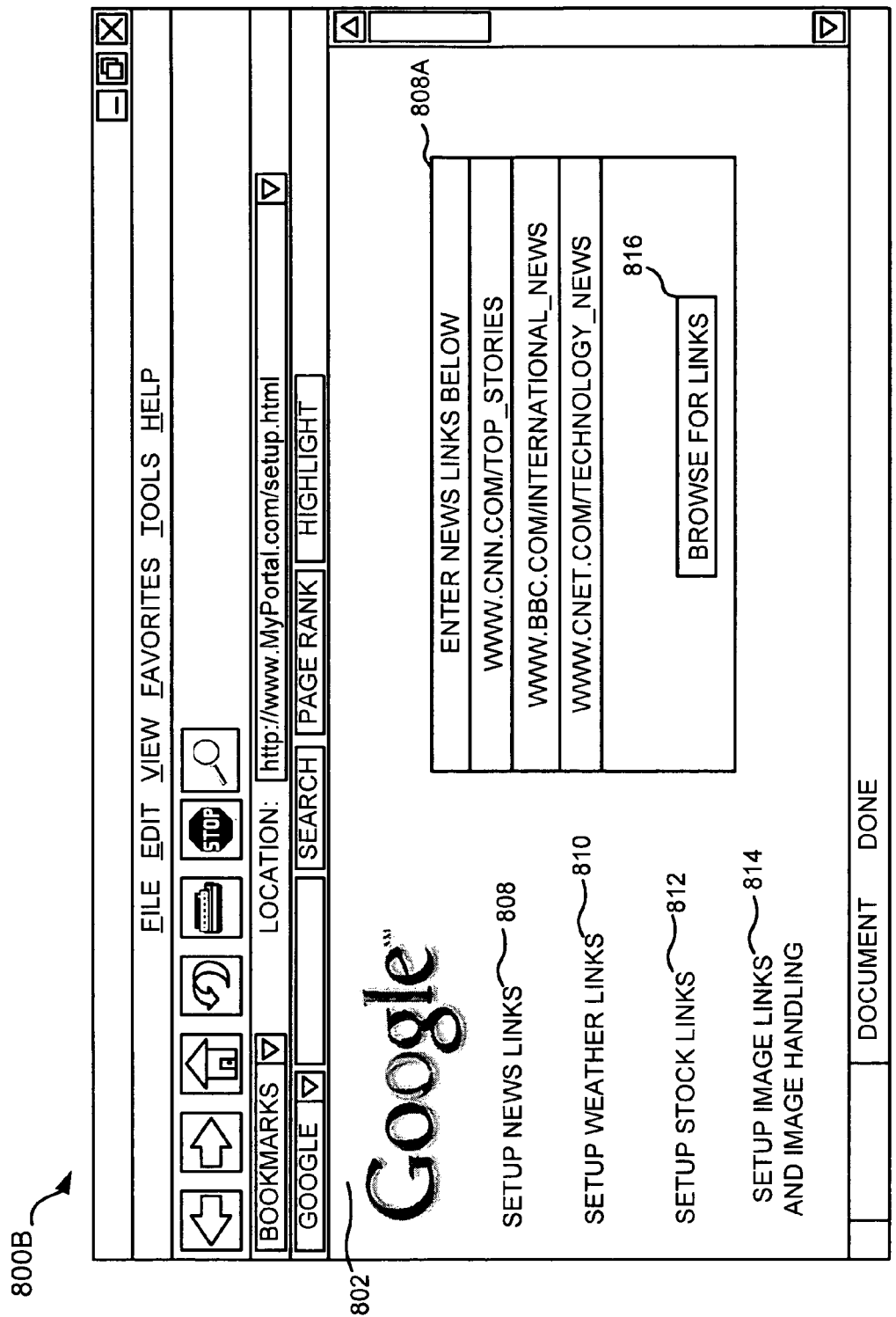
Figure 8C:
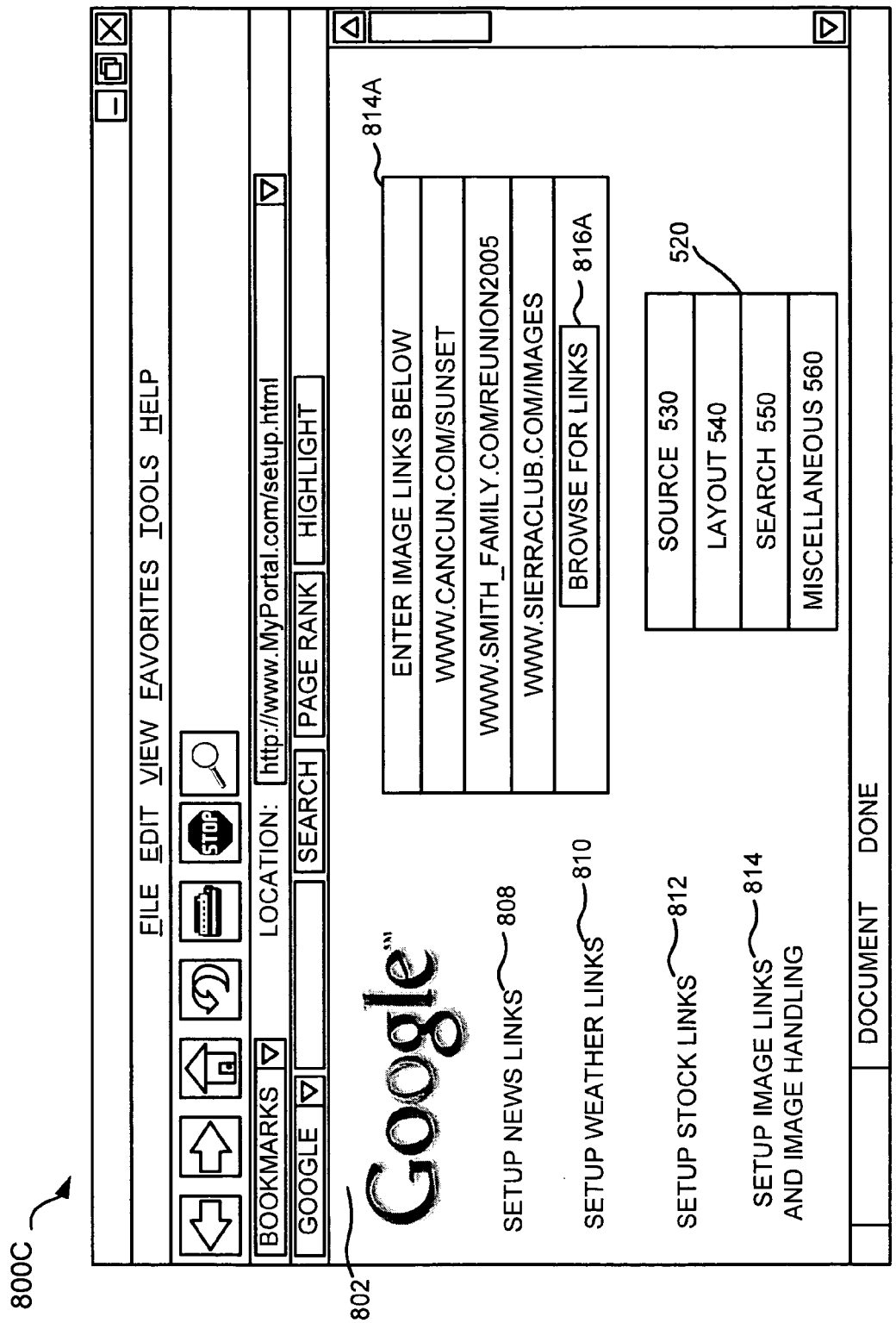
Figure 8D:
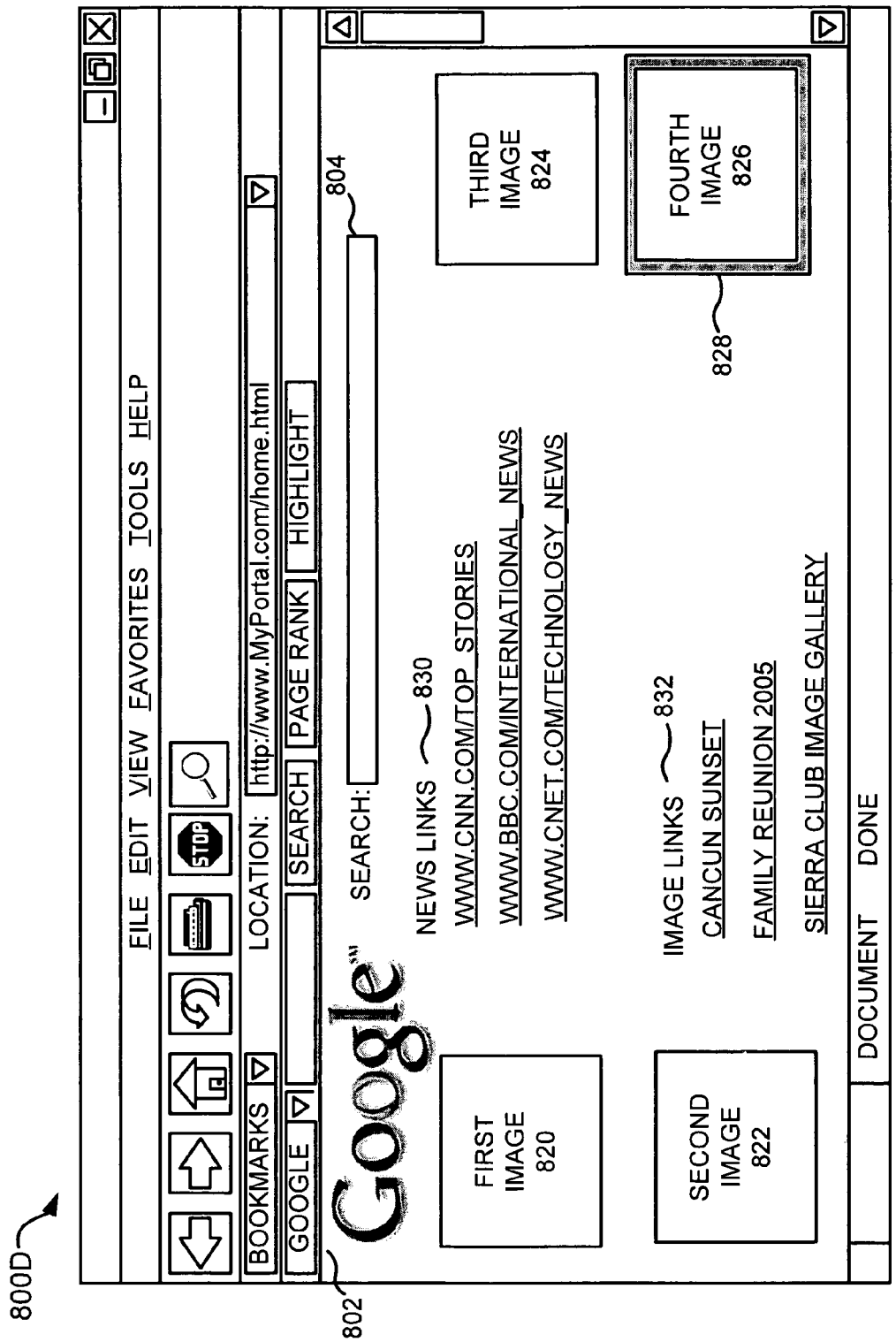

FIG. 8D illustrates an exemplary web page 800D that may serve as a home page for the user after the user completes the configuration actions associated with FIGS. 8A-8C. Display window 802 may display four images, such as first image 820, second image 822, third image 824 and fourth image 826. Images 820-826 may rotate in a clockwise direction within display window 802 as specified by the user in connection with layout entry 540 (FIG. 8B). Fourth image 826 may include a unique border 828 that indicates additional content is associated with fourth image 826. For example, the user may be directed to a web site that includes a document related to the content of fourth image 826 if the user clicks on fourth image 826 using a pointing device. Display window 802 may also include news links 830 and image links 832 as selected by the user. For purposes of this example, it is assumed that the user did not select any weather links or stock links for display within display window 802.

CONCLUSION

Implementations consistent with the principles of the invention may provide user interface software to provide a user with the ability to select the content, number, size and arrangement of images that are displayed on a display device. The image software application also lets the user select other aspects associated with images that are displayed in connection with the user interface application.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, an alternative implementation consistent with the principles of the invention may be configured so that the number of links and/or images associated with displayed links changes each time a web page is refreshed by the user. In another alternative implementation consistent with the principles of the invention, a user may select a theme for his/her homepage and may receive links and/or images that are associated with the theme. The theme related links and/or images may be displayed within web pages presented to the user. In still another alternative implementation consistent with the principles of the invention, the user may subscribe to personal images, such as those associated with online dating services. The personal images may change while the user interacts with a web page. The user may be able to click on displayed images to associate a "more like this" attribute to the images that are clicked on. A server may select new images to display on the web page based on the user's preferences expressed with respect to previously displayed images. In yet another alternative implementation consistent with the principles of the invention, a user may exchange links with other users in a manner that allows users to share links. Shared links may facilitate making content known to one user available to another user.

While series of acts have been described with regard to FIGS. 7A and 7B, the order of the acts may be modified in other implementations consistent with the principles of the invention. Further, non-dependent acts may be performed in parallel. Acts described in connection with FIGS. 1, 5-6, and 8 may be performed in sequences that are different than sequences described in connection with FIGS. 1, 5-6, and 8. Moreover, certain acts may be omitted from described sequences and other acts may be added to the described sequences without departing from the spirit of the invention.

Also, exemplary user interfaces have been described with respect to FIGS. 1, 5-6 and 8. In other implementations consistent with the principles of the invention, the user interfaces may include more, fewer, or different pieces of information.

The preceding description refers to a user. A "user" is intended to refer to a client, such as a client 210 (FIG. 2), or an operator of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more server devices comprising:
a memory to store instructions; and
one or more processors to execute the instructions to:
receive from a user:
one or more keywords of a topic related to images to be displayed in a web portal web page, and
interval information identifying an interval for periodically performing a search to obtain the images based on the one or more keywords, receive, from the user, parameters that include:
an update rate that specifies a rate at which additional images are obtained,
the additional images replacing the images in the web portal web page, and
a rotation rate that specifies a rate at which the images visually move, in the web portal web page,
to simulate a rotation when displayed in the web portal web page, store, in the memory, the one or more keywords, the interval information, and the parameters,
validate an identity of the user when the user requests access to the web portal web page,
retrieve, from the memory and based on validating the identity of the user, the one or more keywords, the interval information, and the parameters,
generate the web portal web page based on the retrieved one or more keywords, the retrieved interval information, and the retrieved parameters,
when generating the web portal web page, the one or more processors are to:
periodically perform, at the interval identified by the retrieved interval information, a search based on the retrieved one or more keywords to obtain a plurality of images related to the topic,
the generated web portal web page including the plurality of images, and
provide the generated web portal web page,
the plurality of images being provided, in the provided web portal web page, based on the retrieved parameters.

2. The one or more server devices of claim 1, where the one or more processors are further to:
receive, from the user, information identifying a source of images,
store the information identifying the source of images in the memory,
retrieve, from the memory and based on validating the identity of the user, the information identifying the source of images,
randomly select at least one image from the source of images based on the retrieved information identifying the source of images,
where the randomly selected at least one image is stored in an image cache associated with the one or more server devices, and
provide the randomly selected at least one image, with the plurality of images, in the provided web portal web page.

3. The one or more server devices of claim 1, where the parameters, received from the user, further include a rotation parameter that specifies a direction of the rotation, and
where, when providing the generated web portal web page, the one or more processors are further to:
visually rotate, in the provided web portal web page, the plurality of images in the direction of the rotation specified by the rotation parameter, included in the retrieved parameter, and at the rate specified by the rotation rate included in the retrieved parameter,
obtain one or more additional images at a rate specified by the update rate included in the retrieved parameter, and
replace one or more of the plurality of images with the one or more additional images.

4. The one or more server devices of claim 2, where the randomly selected at least one image is associated with a link to additional content to be accessed by the user.

5. The one or more server devices of claim 4, where the one or more processors are further to:
provide the additional content to the user when the user interacts with the randomly selected at least one image while the randomly selected at least one image is displayed within the provided web portal web page.

6. The one or more server devices of claim 1, where the one or more processors are further to:
generate another web portal web page based on a refresh request initiated by the user,
where the other web portal web page includes at least one link to another image that was not included in the web portal web page.

7. The one or more server devices of claim 2, where the randomly selected at least one image is associated with the topic.

8. The one or more server devices of claim 2, where the randomly selected at least one image is displayed in the web portal web page according to a schedule determined by the user.

9. A non-transitory computer readable medium storing instructions, the instructions comprising:
   a plurality of instructions which, when executed by a computing device, cause the computing device to:
      receive from a user:
         one or more keywords of a topic related to images to be displayed in a web portal web page when the user accesses the web portal web page, and
         interval information identifying an interval for periodically performing a search to obtain the images based on the one or more keywords;
      receive, from the user, parameters that include:
         an update rate that specifies a rate at which additional images are obtained,
            the additional images replacing the images in the web portal web page,
         a rotation rate that specifies a rate at which the images visually move, in the web portal web page, to simulate a rotation when displayed in the web portal web page;
      store, in a memory of the computing device, the one or more keywords, the interval information, and the parameters;
      validate an identity of the user when the user requests access to the web portal web page;
      retrieve, from the memory and based on validating the identity of the user, the one or more keywords, the interval information, and the parameters;
      generate the web portal web page based on the retrieved one or more keywords, the retrieved interval information, and the retrieved parameters,
         one or more instructions, of the plurality of instructions, to generate the web portal web page including:
            one or more instructions to periodically perform, at the interval identified by the retrieved interval information, a search based on the retrieved one or more keywords to obtain a plurality of images related to the topic,
               the plurality of images being provided in the generated web portal web page based on the retrieved parameters; and
      provide the generated web portal web page.

10. The non-transitory computer readable medium of claim 9, where the parameters, received from the user, further include:
   source parameters that identify a source of images,
   where the non transitory computer readable medium instructions further include includes one or more instructions to:
   store the source parameters in the memory,
   retrieve, from the memory and based on validating the identity of the user, the source parameters,
   randomly select at least one image from the source of images identified by the retrieved source parameters, and
   provide the randomly selected at least one image, with the plurality of images, in the provided web portal web page.

11. The non-transitory computer readable medium of claim 9, where the plurality of images includes a content link that is used by the user to access additional content.

12. The non-transitory computer readable medium of claim 11, where the additional content includes a document, another image, audio data, video data, or an application.

13. The non-transitory computer readable medium of claim 10, where the source of images includes a memory of a client device associated with the user, and
   where the plurality of images are obtained from a plurality of web documents stored in a memory that is different than the memory of the client device.

14. The non-transitory computer readable medium of claim 9, the instructions further comprising:
   one or more instructions to provide, with the provided web portal web page, a plurality of links associated with the plurality of images, and
   one or more instructions to provide a different plurality of links after the provided web portal web page has been refreshed.

15. The non-transitory computer readable medium of claim 14, where the plurality of links are associated with the topic.

16. A method comprising:
   receiving by one or more server devices and from a user:
      one or more keywords of a topic related to images to be displayed in a web page when the user accesses the web page, and
      interval information identifying an interval for periodically performing a search to obtain the images based on the one or more keywords;
   receiving, by the one or more server devices and from the user, parameters that specify:
      an update rate that specifies a rate at which one or more additional images are obtained,
         the one or more additional images replacing the images, that are displayed in the web page,
      a rotation parameter that specifies a direction of rotation of the images displayed in the web page, and
      a rotation rate that specifies a rate at which the images visually rotate, in the direction of rotation, in the web page when displayed in the web page;
   storing, by the one or more server devices and in a memory associated with the one or more server devices, the one or more keywords, the interval information, and the parameters;
   receiving, by the one or more server devices, a request from the user to access the web page;
   validating, by the one or more server devices, an identity of the user based on receiving the request;
   retrieving, by the one or more server devices from the memory and based on validating the identity of the user, the one or more keywords, the interval information, and the parameters;
   generating the web page, based on the retrieved one or more keywords, the retrieved interval information, and the retrieved parameters,
      generating the web page including:
         periodically performing, by the one or more server devices and at the interval identified by the retrieved interval information, a search based on the retrieved one or more keywords to obtain a plurality of images related to the topic,
            the plurality of images being included in the web page; and
   providing, by the one or more server devices and to the user, the web page including the plurality of images,
      the plurality of images being provided, in the web page, based on the retrieved parameters.

17. The method of claim 16, further comprising:
storing the plurality of images in a storage device associated with the web page.

18. The method of claim 16, further comprising:
receiving, from the user, a command to refresh the web page;
generating another web page that includes an image that was not included in the web page; and
providing the other web page to the user.

19. The method of claim 16, where the plurality of images are displayed based on a schedule determined by the user.

20. The method of claim 16, further comprising:
randomly selecting an image from a source of images identified by the user,
where the image is stored locally at a computer of the user, and
where the plurality of images are obtained from documents stored remotely relative to the computer of the user.

21. A system comprising:
one or more server devices to:
receive from a user:
one or more keywords of a topic related to images that are to be displayed to the user when the user accesses a web page, and
interval information identifying an interval for periodically performing a search to obtain the images based on the one or more keywords;
receive parameters from the user, the parameters including:
a rotation parameter that specifies a direction of rotation of the images when displayed in the web page, and
a rotation rate that specifies a rate at which the images visually rotate, in the direction of rotation, in the web page when displayed in the web page;
store, in a memory associated with the one or more server devices, the one or more keywords, the interval information, and the parameters;
validate an identity of the user when the user accesses the web page;
retrieve, from the memory and based on validating the identity of the user, the one or more keywords, the interval information, and the parameters;
generate the web page based on the retrieved one or more keywords, the retrieved interval information, and the retrieved parameters,
when generating the web page, the one or more server devices are to:
periodically perform, at the interval identified by the retrieved interval information, a search based on the retrieved one or more keywords to obtain a plurality of images related to the topic,
the plurality of images being included in the generated web page; and
provide the generated web page with the plurality of images,
the plurality of images being provided, in the generated web page, based on the retrieved parameters.

22. The system of claim 21, where the parameters, received from the user, further include parameters associated with sharing of images with other users, and
where the one or more server devices are further to:
store, in the memory, the parameters associated with sharing of images with the other users,
retrieve, from the memory and based on validating the identity of the user, the parameters associated with sharing of images with the other users, and
share one or more of the plurality of images with the other users based on the retrieved parameters associated with sharing of images with the other users.

23. The system of claim 21, where the stored parameters, received from the user, further include:
an update rate that specifies a rate at which one or more additional images are obtained,
the one or more additional images replacing the images in the web page, and at least one of:
parameters identifying a quantity of images to be displayed in the web page, or
parameters identifying special effects associated with display of the plurality of images.

24. The system of claim 21, where the one or more server devices are further to:
receive, from a user, information identifying at least one of a type of image or an image size limit,
store, in the memory, the information identifying the at least one of the type of image or the image size limit, and
retrieve, from the memory and based on validating the identity of the user, the information identifying the at least one of the type of image or the image size limit,
where, when periodically performing the search, the one or more server devices are to perform the search based on the retrieved information identifying the at least one of the type of image or the image size limit.

25. The system of claim 21, where the one or more server devices are further to:
receive from the user:
information identifying a scope of the search, or
information identifying particular content, the information identifying the particular content indicating that images, associated with the particular content, are to be excluded from results of performing the search,
store, in the memory, the information identifying the scope of the search or the information identifying the particular content, and
retrieve, from the memory and based on validating the identity of the user, the information identifying the scope of the search or the information identifying the particular content,
where, when periodically performing the search, the one or more server devices are to perform the search based on at least one of the retrieved information identifying the scope of the search or the retrieved information identifying the particular content.

26. The one or more server devices of claim 1, where the one or more processors are further to:
receive, from the user, information identifying at least one of a type of image or a size of image,
store, in the memory, the information identifying the at least one of the type of image or the size of image, and
retrieve, from the memory and based on validating the identity of the user, the information identifying the at least one of the type of image or the size of image,
where, when periodically performing the search, the one or more processors are to perform the search based on the retrieved information identifying the at least one of the type of image or the size of image.

27. The one or more server devices of claim 1, where the one or more processors are further to:

receive from the user:
   information identifying a scope of the search, or
   information identifying particular content, the information identifying the particular content indicating that images, associated with the particular content, are to be excluded from results of performing the search,
store, in the memory, the information identifying the scope of the search or the information identifying the particular content, and
retrieve, from the memory and based on validating the identity of the user, the information identifying the scope of the search or the information identifying the particular content,
where, when periodically performing the search, the one or more processors are to perform the search based on at least one of the retrieved information identifying the scope of the search or the retrieved information identifying the particular content.

28. The non-transitory computer readable medium of claim 9, the instructions further comprising:
one or more instructions to:
   receive from the user:
      information identifying a scope of the search, or
      information identifying particular content, the information identifying the particular content indicating that images, associated with the particular content, are to be excluded from results of performing the search,
   store, in the memory, the information identifying the scope of the search or the information identifying the particular content, and
   retrieve, from the memory and based on validating the identity of the user, the information identifying the scope of the search or the information identifying the particular content,
where one or more instructions, of the plurality of instructions, to periodically perform the search include one or more instructions to perform the search based on at least one of the retrieved information identifying the scope of the search or the retrieved information identifying the particular content.

29. The non-transitory computer readable medium of claim 9, the instructions further comprising:
one or more instructions to:
   receive, from the user, information identifying at least one of a type of image or a size of image,
   store, in the memory, the information identifying the at least one of the type of image or the size of image, and
   retrieve, from the memory and based on validating the identity of the user, the information identifying the at least one of the type of image or the size of image,
where one or more instructions, of the plurality of instructions, to periodically perform the search include one or more instructions to perform the search based on the retrieved information identifying the at least one of the type of image or the size of image.

30. The method of claim 16, further comprising:
receiving from the user:
   information identifying a scope of the search, or
   information identifying particular content, the information identifying the particular content indicating that images, associated with the particular content, are to be excluded from results of performing of the search,
storing, in the memory, the information identifying the scope of the search or the information identifying the particular content, and
retrieving, from the memory and based on validating the identity of the user, the information identifying the scope of the search or the information identifying the particular content,
where periodically performing the search includes performing the search based on at least one of the retrieved information identifying the scope of the search or the retrieved information identifying the particular content.

31. The method of claim 16, further comprising:
receiving from the user information identifying at least one of a type of image or a size of image,
storing, in the memory, the information identifying the at least one of the type of image or the size of image, and
retrieving, from the memory and based on validating the identity of the user, the information identifying the at least one of the type of image or the size of image,
where periodically performing the search includes performing the search based on the information identifying the retrieved at least one of the type of image or the size of image.

* * * * *